United States Patent [19]

Pacansky

[11] 4,081,572
[45] Mar. 28, 1978

[54] PREPARATION OF HYDROPHILIC LITHOGRAPHIC PRINTING MASTERS

[75] Inventor: Thomas J. Pacansky, Penfield, N.Y.

[73] Assignee: Xerox Corporation, Stamford, Conn.

[21] Appl. No.: 769,078

[22] Filed: Feb. 16, 1977

[51] Int. Cl.$^2$ .............................................. B41C 1/10
[52] U.S. Cl. ................... 427/53; 260/77.5 C; 260/78 A; 260/78 UA; 427/385 R; 427/388 R; 101/467
[58] Field of Search ................. 427/43, 44, 53–56, 427/385, 388; 260/77.5 C, 78 A, 78 UA

[56] References Cited

U.S. PATENT DOCUMENTS

| | | | |
|---|---|---|---|
| 3,535,148 | 10/1970 | Rauve | 427/54 X |
| 3,743,777 | 7/1973 | Hanus et al. | 427/53 X |
| 3,892,573 | 7/1975 | Tatsuta et al. | 427/54 X |
| 3,900,594 | 8/1975 | Guthrie et al. | 427/53 |
| 3,945,318 | 3/1976 | Landsman | 427/53 X |
| 3,962,241 | 6/1976 | Hunter | 427/53 X |
| 3,962,513 | 6/1976 | Eames | 427/53 X |
| 3,964,389 | 6/1976 | Peterson | 427/53 X |

*Primary Examiner*—Bernard D. Pianalto
*Attorney, Agent, or Firm*—J. J. Ralabate; J. P. O'Sullivan; D. M. MacKay

[57] ABSTRACT

Hydrophilic printing masters are provided comprising coating a self-supporting master substrate with a hydrophilic polymer containing carboxylic acid functionality and selectively converting this polymer in image configuration to a hydrophobic condition by heat.

9 Claims, No Drawings

PREPARATION OF HYDROPHILIC LITHOGRAPHIC PRINTING MASTERS

BACKGROUND OF THE INVENTION

The preparation of lithographic printing masters generally involves multiple processing steps including etching and various chemical treatments to render the surface layer hydrophilic.

It has now been discovered that hydrophilic polymers containing carboxylic acid functionality can be selectively converted in image configuration to a hydrophobic state, such as by use of a laser, to form printing masters quickly and inexpensively.

BRIEF DESCRIPTION OF THE INVENTION

In accordance with the invention, a self-supporting master substrate is first coated with a film forming polymer of the formula:

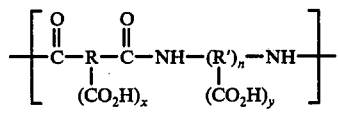

wherein R' is a carbonyl group or R and R' are the same or different hydrocarbon moieties, $n$ is an integer of 0 or 1, $x$ and $y$ are the same or different integers of from 0 to 2 providing that when $n$ is 0, $y$ is 0 and when R' is a carbonyl group, $y$ is 0. In a preferred embodiment, $n$ is 0 and $x$ is 2 to provide polymers of the formula:

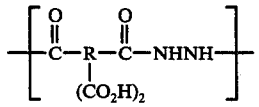

wherein R is as previously defined and the carboxylic acid groups are positioned ortho to the adjacent carbonyl groups.

The polymer is then selectively converted to a hydrophobic condition in image configuration through cyclodehydration reactions by selective exposure to heat. The resultant masters are then ready for inking and printing as they are hydrophobic in the image areas and hydrophilic in the background areas.

DETAILED DESCRIPTION OF THE INVENTION

Suitable master materials, methods of imaging and other aspects of the invention will now be described in detail.

Master substrates which can be employed to prepare the printing master are self-supporting materials to which the hydrophilic polymer can be adhered and which possesses sufficient heat and mechanical stability to permit use under widely varying printing and handling conditions. Exemplary of suitable materials are paper, metal such as aluminum, and plastic such as polyester, polycarbonate, polysulfone, nylon and polyurethane.

Hydrophilic polymers which can be employed include a large number of polymers. For example, in the formula:

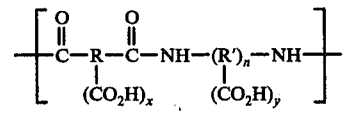

R' is a carbonyl group or R and R' are the same or different hydrocarbon moieties which may be acyclic, aliphatic cyclic or bicyclic or aromatic, $n$ is an integer of 0 or 1, $x$ and $y$ are integers of from 0 to 2 providing that when $n$ is 0, $y$ is 0 and when R' is a carbonyl group $y$ is 0. Representative substituents include phenylene, naphthalene, anthrylene, cyclobutylene, cyclopentylene, cycloheptylene, cyclohexylene, cyclooctylene, octylene, hexylene, heptylene, butylene, and the like with preferably two carboxylic acid groups per molecule (i.e. per R group), preferably positioned ortho to the carbonyl groups. Preferably, R and R' have from 3 to 6 carbon atoms excluding the pendant carboxylic acid groups and $x + y = 2$ to 4 or R' is a carbonyl group and $x$ is 2.

Representative examples of hydrophilic materials are exemplified by the following structures:

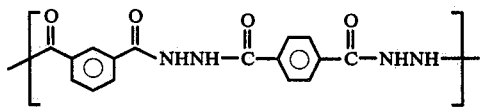

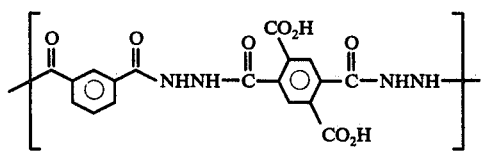

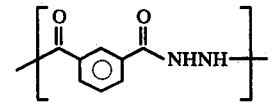

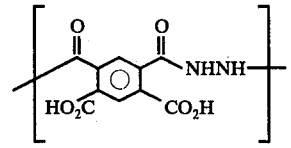

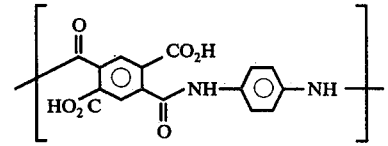

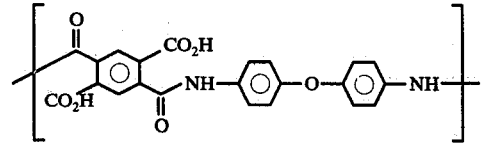

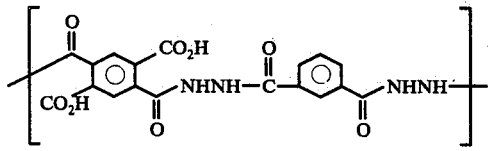

-continued

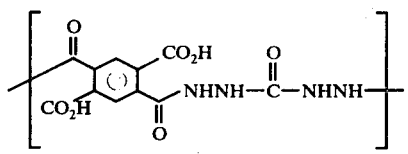

The hydrophilic polymers are made by conventional means such as by mixing equimolar quantities of an acid dianhydride with an acid hydrazide or diamine and the like in a suitable solvent such as anhydrous N-methyl pyrrolidone or dimethyl acetamide at room temperature for about 18 hours under an inert atmosphere such as a nitrogen atomosphere. The solution can then be sprayed, draw bar coated or the like onto the substrate and heated for about ½ hour at 50° C to evaporate the solvent, cure the polymer and bond it to the substrate.

If desired fillers and other additives can be mixed with the hydrophilic polymers to provide strength or additional hydrophilicity such as zinc oxide, carbon black, titanium dioxide and the like.

Conventional thermal means can be employed to selectively convert the polymer to a hydrophobic condition in image configuration by cyclodehydration reactions. For example, a laser beam may be employed or other activating electromagnetic radiation selectively applied through a transparency mask. The resultant printing master can then be employed with conventional commercial inks, fountain solutions and printing equipment.

The following examples will serve to illustrate the invention and preferred embodiments thereof. All parts and percentages in said examples and elsewhere in the specification and claims are by weight unless otherwise specified.

EXAMPLE I

The copolymer of phthalic acid and isophthalic acid hydrazide was prepared by mixing equimolar quantities in anhydrous N-methyl pyrrolidone at 25° C for 18 hours under a nitrogen blanket. The solution is draw bar coated onto an aluminum substrate using a 3 mil opening and after air drying the coated substrate is placed in a 50° C air oven for ½ hour. The resultant master is selectively imaged with a Xenon flash lamp emitting about ½ J/cm² by means of a negative transparency mounted above the coating. The imaged master is then mounted on a Davidson Dual-a-matic printing press operating in the offset mode and excellent prints obtained employing conventional inks and fountain solutions.

EXAMPLES II – IV

The procedure of Example I is repeated with the copolymers of pyromellitic dianhydride and semicarbazide, and polymellitic dianhydride and ethylene diamine. Similar results are found.

EXAMPLES V – VIII

The general procedure of examples I – IV is repeated but for the exception that the masters are imaged by exposure to a Nd-γAG Laser at 1μ wavelength to create small ink accepting dots.

EXAMPLES VIIII – XII

The general procedure of Examples V to VIII are repeated but with the exception that 10% by weight of an IR absorber (American Cyanamide IR 99) is incorporated into the hydrophilic polymer along with 5% by weight carbon black.

Having described the present invention with reference to those specific embodiments, it is to be understood that numerous variations can be made without departing from the spirit of the invention and it is intended to encompass such reasonable variations or equivalents within its scope.

What is claimed is:

1. A method for preparing a printing master comprising:
   (a) providing a self-supporting master substrate,
   (b) providing a hydrophilic polymer of the formula:

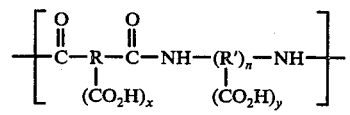

wherein R' is a carbonyl group or R and R' are the same or different hydrocarbon moieties which may be acyclic, aliphatic cyclic or bicyclic or aromatic, n is an integer of 0 or 1, x and y are integers of from 0 to 2 providing that when n is 0, y is 0, and when R' is a carbonyl group, y is 0,
   (c) coating said substrate with said polymer, and
   (d) selectively thermally converting said polymer to a hydrophobic condition in image configuration.

2. The method of claim 1 wherein the hydrophilic polymer is selectively converted to a hydrophobic condition in image configuration by laser exposure.

3. The method of claim 1 wherein the hydrophilic polymer is of the formula:

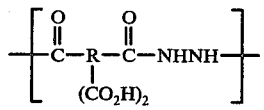

wherein R is a hydrocarbon moiety of from 3 to 6 carbon atoms and the pendant carboxylic acid groups are positioned ortho to the adjacent carbonyl groups.

4. The printing master of claim 1 wherein the substrate is formed of aluminum or Mylar.

5. The method of claim 1 wherein the copolymer is formed of pyromellitic dianhydride and ethylene diamine.

6. The method of claim 3 wherein the substrate is formed of aluminum or Mylar.

7. The method of claim 1 wherein the polymer is formed of phthalic acid and isophthalic acid hydrazide.

8. The method of claim 1 wherein the copolymer is formed of pyromellitic dianhydride and isophthalic acid hydrazide.

9. The method of claim 1 wherein the copolymer is formed of pyromellitic dianhydride and semicarbazide.